United States Patent [19]

Janicki et al.

[11] 3,932,676

[45] Jan. 13, 1976

[54] METHOD FOR DYEING PROTEIN ARTICLES OF FOOD, ESPECIALLY PROTEIN CASINGS

[75] Inventors: Mieczyslaw Janicki; Henryk Muler; Wladyslaw Nijaki, all of Warsaw, Poland

[73] Assignee: Instytut Prezemyslu Miesnego, Warsaw, Poland

[22] Filed: Aug. 30, 1974

[21] Appl. No.: 502,104

[30] Foreign Application Priority Data

Sept. 1, 1973 Poland.................................. 165010

[52] U.S. Cl................................ 426/250; 426/540
[51] Int. Cl.².......................................... A23L 1/275
[58] Field of Search ........... 426/177, 250, 540, 652; 8/3, 53

[56] References Cited
UNITED STATES PATENTS 1,690,449  11/1928  Jourdan ............................ 426/250
2,007,727  7/1935  Putt .................................... 426/177
3,285,906  11/1966  Kretlow et al. .................. 426/177 X

*Primary Examiner*—James R. Hoffman
*Attorney, Agent, or Firm*—Haseltine, Lake & Waters

[57] ABSTRACT

The invention relates to a method of surface dyeing of protein articles of food, such as meat, cheese, fish etc., particularly of protein casings used as outer coverings of food-stuffs. It consists in subjecting the protein products to the action of a dyeing substance comprising an aqueous solution of a wood-bark extract, advantageously of oak or birch bark. The protein product may be dyed: by immersing the product in the dyeing solution, by sprinkling the product with the solution or by contacting the product with an aerosol formed by spraying the solution of the extract. The dyeing process according to the invention may be applied both to raw casings and to casings filled with the food-mass in the form of batons.

11 Claims, No Drawings

METHOD FOR DYEING PROTEIN ARTICLES OF FOOD, ESPECIALLY PROTEIN CASINGS

The invention relates to a method of surface dyeing of protein articles of food, such as meat, cheese, fish etc., particularly of protein casings of natural origin or produced by processing from collagen mass, which are used as outer coverings of articles of food.

The previously used dyeing of meat, cheese, fish and protein casings during the process of curing by means of smoke obtained by burning of wood in smoke houses has brought up questions relating to health and hygiene mainly because of the rather considerable amounts of toxic and carcinogenic substances contained in the curing-smoke. Because these admixtures are dangerous to human health, the traditional method of curing articles of food in curing-smoke has tended to become abandoned over a period of years and to be replaced by the use of aromatizing preparations obtained both synthetically and by isolation in one way or another from substances of natural origin of active taste and smell components harmless to the human health.

All the aromatizing preparations of this kind, in spite of the fact that in many cases they impart to articles of food taste and smell properties really identical with those obtained in the traditional way of curing in smoke, exhibit a rather essential disadvantage viz. they do not contain dyeing components and in addition, they are to be found only in the interior of the product, which in view of the fact that consumers are accustomed to the traditional gold-brown color of the surface of smoked products, is of very essential importance.

Though there already exist methods of dyeing food casings with synthetic dyes, e.g. crythrosin, nevertheless due to their uncertain action on the human organism and to different technological disadvantages they have not found extensive industrial application.

The problem of dyeing protein articles of food, particularly protein casings, has been overcome in a most favorable manner by the dyeing method which is the subject of the present invention. It consists in dyeing the products with a wood-bark extract obtained from oak, birch or other trees. These extracts have a very great affinity for protein and in a short time form a permanent complex, with it imparting to protein products a color perfectly imitating the color obtained during the traditional smoke-curing process. Coloring with wood-bark extract can be applied to: natural casings, i.e. conveniently cleaned entrails of slaughtered animals, all protein casings, e.g. collagen casings, and direct protein articles of food such as meat, cheese, fish etc.

For dyeing, aqueous solutions of the woodbark extract having a concentration of 0.5 – 5 % are used. The dyeing process according to the invention may be performed at different food-production stages. The casings are subjected to dyeing in a raw state prior to filling them with the food mass, or after putting in the mass in the form of so-called batons, whereas other food products are dyed prior to thermal treatment. The dyeing is carried out in a cold state i.e. at ambient temperature, or in a warm state, depending on the method used. The dyeing time amounts to 1.0 – 15 minutes depending on the temperature of the solution, concentration of the dyeing substance, nature of the product and on the required color intensity of the food product being treated.

The dyeing method according to the invention may be carried out by using, depending on the existing technical conditions, on the kind of the product and on the required effect, one of three methods: a) the immersion method i.e. by immersing the protein product in the aqueous solution of the woodbark extract, b) by sprinkling the dyeing solution on the products c) by subjecting the products to the action of the dyeing solution sprayed in the form of an aerosol.

The immersion method is used with all food-stuffs, including raw casings and filled batons. During the dyeing process a rather intensive stirring is used. After the dyeing process the raw casings are rinsed several times with water in order to remove the excess extract. Special advantageous effects are obtained when using the dyeing method by immersion in a cold state or together with the cooking process of batons and of other meat products in boilers for so-called cooked sausages.

The dyeing method consisting in sprinkling the protein products with the dye sprayed in form of a fine rain exhibits the advantage that it makes it possible to carry out the process in a closed cycle, the solution flowing off being collected and, after replenishing with the dyeing extract to the required concentration, being recycled to the dyeing process.

The method consisting in spraying the dyeing solution in the form of an aerosol and leaving the protein products under the action of the produced mist for a certain time, requires conveniently ventilated and tight rooms. The atomization of the solution can be obtained by pressure with the aid of compressed air, steam etc., by mechanical spraying, etc. When using this method it is advantageous to produce an electrostatic potential between the product being dyed and the mist, owing to which an intensification of the reaction and a more uniform distribution of the dye on the surface of the product takes place.

The method of dyeing the protein products with the wood-bark extract according to the invention exhibits a series of advantages such as above all: obtaining of a gold-brown color perfectly imitating the effect of the traditional smoke-curing, non-toxicity and absolute harmlessness for the human health, technical facility and economy of the production process, and that it does not require expensive investments nor devices, is fully reliable and provides large possibilities of application.

The dyeing process according to the invention is illustrated in the examples stated below:

EXAMPLE I

Bacon and pork fillet prior to pickling were immersed in 1.5 % aqueous oak wood-bark extract solution of room-temperature in a ratio at the product mass to the dyeing liquid of 1 : 4. After 5 minutes the bacon and the fillet were taken out and were subjected to the drying process at elevated temperature.

EXAMPLE II

Cleaned fresh casings were immersed in a 0.8 % aqueous solution of oak wood-bark extract at room temperature in a ratio of the casings mass to the dyeing liquid of 1 : 4. In this solution the casings were held for 5 minutes, with continuous stirring, then the casings were taken out, rinsed in clean water and directed to further production.

EXAMPLE III

Preserved casings prior to having been washed free from salt, were immersed in a 1 % aqueous solution of a birch wood-bark extract at room temperature for 4 minutes while continuously stirring. After this time the intestines were taken out, washed in clean water and directed to further production.

EXAMPLE IV

Casings made of collagen mass were drawn through a container with a 2 % aqueous solution of an oak wood-bark extract at room temperature using an immersion time of 3 minutes, whereupon after further drawing through containers with clean water for washing out the excess solution, the casings were directed to further production.

EXAMPLE V

Batons freshly filled with sausage-meat containing an aromatizing preparation of smoked bacon taste, were immersed in an aqueous solution of an oak wood-bark extract having a concentration of 0.5 % and at room temperature, for 5 minutes. After removal from the solution the further treatment was carried out according to the known process, excluding the smoking stage.

EXAMPLE VI

An aqueous extract solution having a concentration of 3 % was prepared in a boiler. Raw batons were immersed in the solution for a time allowing the temperature to rise up to 68°C inside the baton. Thus cooking the sausage and dyeing the casing were effected simultaneously. The further processing was carried out according to the traditional method.

EXAMPLE VII

Filled batons hung on sticks were shifted in a 6 m long tank and sprinkled during shifting with a 3 % aqueous extract solution. The sprinkling time was 3 minutes. The operation was carried out in a closed continuous cycle and the outflowing solution of the extract was recycled for sprinkling the batons anew.

EXAMPLE VIII

Loosely suspended batons were placed in a ventilated chamber where with the aid of compressed air a 4 % aqueous solution of the extract was sprayed in the form of a mist. In this chaamber the product was held for 10 minutes at a temperature of 40°C.

EXAMPLE IX

The batons were subjected to dyeing as in example VIII, producing simultaneously an electrostatic potential between the product and the mist of the extract for the purpose of a more rapid and more uniform deposition of the mist on the casings of the batons and entering with it in reaction.

We claim:

1. A method for dyeing a protein food product comprising subjecting the product to the action of a dyeing substance consisting of a wood-bark extract in form of an aqueous solution having a concentration of from 0.5 to 5% until the desired color is imparted to the food product.

2. A method for dyeing according to claim 1 wherein the protein product is immersed in the aqueous solution of the woodbark extract.

3. A method according to claim 2 wherein the solution is continuously stirred during immersion of the protein product.

4. A method for dyeing according to claim 1 wherein the protein product is sprinkled with the aqueous wood-bark solution.

5. A method for dyeing according to claim 1 wherein the protein product is sprayed with the aqueous solution of the wood-bark extract in the form of an aerosol.

6. A method for dyeing according to claim 1 wherein the wood-bark is oak bark.

7. A method for dyeing according to claim 1 wherein the wood-bark is birch bark.

8. A method for dyeing according to claim 1 wherein the protein product is in the form of casings.

9. A method according to claim 8 wherein the casings are drawn through the solution of wood-bark extract.

10. A method according to claim 1 wherein the dyeing is carried out at an elevated temperature so that the protein product is cooked and dyed simultaneously.

11. A method according to claim 1 wherein the dyeing is carried out for a period of 1 to 15 minutes.

* * * * *